United States Patent
Osterfeld

(10) Patent No.: US 11,518,335 B2
(45) Date of Patent: Dec. 6, 2022

(54) DRIVER SIDE AIRBAG MODULE

(71) Applicant: Joyson Safety Systems Acquisition LLC, Auburn Hills, MI (US)

(72) Inventor: Doug Osterfeld, Waterford, MI (US)

(73) Assignee: JOYSON SAFETY SYSTEMS ACQUISITION LLC, Auburn Hills, MI (US)

(*) Notice: Subject to any disclaimer, the term of this patent is extended or adjusted under 35 U.S.C. 154(b) by 0 days.

(21) Appl. No.: 16/919,419

(22) Filed: Jul. 2, 2020

(65) Prior Publication Data

US 2021/0001797 A1    Jan. 7, 2021

Related U.S. Application Data

(60) Provisional application No. 62/869,928, filed on Jul. 2, 2019.

(51) Int. Cl.
| | |
|---|---|
| *B60R 21/203* | (2006.01) |
| *B60R 21/2338* | (2011.01) |
| *B60R 21/216* | (2011.01) |
| *B60R 21/015* | (2006.01) |
| *B60R 21/26* | (2011.01) |
| *B60R 21/01* | (2006.01) |
| *B60R 21/16* | (2006.01) |

(52) U.S. Cl.
CPC .... *B60R 21/2035* (2013.01); *B60R 21/01512* (2014.10); *B60R 21/216* (2013.01); *B60R 21/2338* (2013.01); *B60R 21/26* (2013.01); *B60R 2021/01231* (2013.01); *B60R 2021/161* (2013.01)

(58) Field of Classification Search
CPC .. B60R 21/231; B60R 21/2338; B60R 21/203
See application file for complete search history.

(56) References Cited

U.S. PATENT DOCUMENTS

| | | | | |
|---|---|---|---|---|
| 6,932,384 | B2 * | 8/2005 | Waid | B60R 21/233 |
| | | | | 280/739 |
| 7,021,657 | B2 * | 4/2006 | Kassman | B60R 21/233 |
| | | | | 280/743.2 |
| 7,278,510 | B1 * | 10/2007 | Richards | B62D 1/046 |
| | | | | 180/336 |

(Continued)

FOREIGN PATENT DOCUMENTS

| | | | | |
|---|---|---|---|---|
| DE | 102010039759 | A1 * | 1/2012 | B60R 21/2338 |
| DE | 102017120509 | A1 * | 6/2018 | B60R 21/01 |

(Continued)

*Primary Examiner* — Nicole T Verley
(74) *Attorney, Agent, or Firm* — Gordon Rees Scully Mansukhani, LLP

(57) ABSTRACT

A vehicle steering system including a yoke type steering wheel. An airbag module located in the steering wheel and including an inflator and an airbag. The airbag is configured to inflate into two configurations. In the first configuration the airbag is fully inflated into a circular configuration and in the second configuration the airbag inflates into a u-shaped configuration. The u-shaped configuration is formed by a tether connected at a first end to the airbag and at a second end to a tether release device. The tether release device is configured to stay connected to the tether when the driver is determined to be in an out of position (OOP) condition.

15 Claims, 10 Drawing Sheets

(56) References Cited

U.S. PATENT DOCUMENTS

| | | | | |
|---|---|---|---|---|
| 7,377,548 B2* | 5/2008 | Bauer | ................... | B60R 21/231 280/743.2 |
| 7,490,854 B2* | 2/2009 | Thomas | .............. | B60R 21/2338 280/739 |
| 7,614,656 B2* | 11/2009 | Ishiguro | ................ | B60R 21/203 280/743.1 |
| 7,651,130 B2* | 1/2010 | Bauberger | ............ | B60R 21/239 280/743.2 |
| 7,726,685 B2* | 6/2010 | Abe | ..................... | B60R 21/233 280/736 |
| 7,784,828 B2* | 8/2010 | Matsu | ................... | B60R 21/233 280/739 |
| 7,857,347 B2* | 12/2010 | Abe | ................... | B60R 21/2338 280/743.2 |
| 8,079,615 B2* | 12/2011 | Tanaka | ................. | B60R 21/203 280/743.2 |
| 8,408,584 B2* | 4/2013 | Paxton | ................ | B60R 21/2338 280/728.2 |
| 8,408,585 B2* | 4/2013 | Paxton | ................ | B60R 21/2338 280/728.2 |
| 8,596,680 B2* | 12/2013 | Kim | ................... | B60R 21/2338 280/743.2 |
| 8,628,114 B1* | 1/2014 | Quioc | ................. | B60R 21/2338 280/743.2 |
| 8,696,022 B2* | 4/2014 | Fischer | .............. | B60R 21/2338 280/739 |
| 8,955,634 B2* | 2/2015 | Bergenheim | ........ | B60R 21/2342 180/274 |
| 9,073,509 B2* | 7/2015 | Pohanka | ................ | B62D 1/046 |
| 9,108,590 B2* | 8/2015 | Williams | .............. | B60R 21/239 |
| 9,187,058 B2* | 11/2015 | Yamaji | ................. | B60R 21/239 |
| 9,272,685 B2* | 3/2016 | Fischer | ................ | B60R 21/239 |
| 9,505,370 B2* | 11/2016 | Kim | ................... | B60R 21/2338 |
| 9,676,364 B2* | 6/2017 | Williams | ............ | B60R 21/2338 |
| 9,738,243 B2* | 8/2017 | Fukawatase | ........ | B60R 21/2338 |
| 9,758,124 B2* | 9/2017 | Kruse | ................ | B60R 21/2338 |
| 9,776,594 B2* | 10/2017 | Gammill | ............ | B60R 21/2338 |
| 10,214,174 B2* | 2/2019 | Zhang | ................... | B60R 21/205 |
| 10,953,838 B2* | 3/2021 | Skrodzki | ............... | B60R 21/233 |
| 2002/0036400 A1* | 3/2002 | Winters | ............ | B60R 21/01538 280/743.2 |
| 2004/0212187 A1* | 10/2004 | Kai | ..................... | B60R 21/2338 280/743.2 |
| 2005/0121889 A1* | 6/2005 | Enders | ................ | B60R 21/2035 280/731 |
| 2005/0127653 A1* | 6/2005 | Williams | ............ | B60R 21/2338 280/743.2 |
| 2007/0108750 A1* | 5/2007 | Bauer | ................ | B60R 21/2338 280/740 |
| 2009/0230663 A1* | 9/2009 | Mills | ................... | B60R 21/2338 280/735 |
| 2009/0302588 A1* | 12/2009 | Schramm | ............... | B60R 21/233 280/743.2 |
| 2010/0019473 A1* | 1/2010 | Dennis | ................ | B60R 21/2338 280/729 |
| 2011/0148081 A1* | 6/2011 | Smith | .................... | B60R 21/18 280/733 |
| 2014/0265280 A1* | 9/2014 | Borton | ................ | B60R 21/2346 280/743.2 |
| 2018/0215340 A1* | 8/2018 | Zhang | ................... | B60R 21/205 |
| 2019/0256032 A1* | 8/2019 | Faruque | ............... | B60R 21/013 |

FOREIGN PATENT DOCUMENTS

| | | | | |
|---|---|---|---|---|
| EP | 3530526 A1 * | 8/2019 | ......... | B60R 21/2338 |
| JP | 2020142607 A * | 9/2020 | | |
| JP | 6806005 B2 * | 12/2020 | | |
| WO | WO-0134436 A1 * | 5/2001 | .......... | B60R 21/276 |
| WO | WO-2012001058 A1 * | 1/2012 | .......... | B60R 21/231 |
| WO | WO-2019235145 A1 * | 12/2019 | ........ | B60R 21/2338 |

* cited by examiner

DRIVER SIDE AIRBAG MODULE

CROSS-REFERENCE TO RELATED APPLICATION

The present application claims priority to and the benefit of U.S. Provisional Patent Application No. 62/869,928, filed Jul. 2, 2019. The foregoing provisional patent application is incorporated by reference herein in its entirety.

GENERAL DESCRIPTION

The present application relates to a driver side airbag module and a steering wheel including such a module. In particular, a yoke steering wheel including an airbag module that includes a dynamic airbag shape mechanism to provide increased safety for multiple situations.

As described further herein, the airbag described and shown in the figures of the present application is provided for a yoke steering wheel. A yoke type steering wheel does not include the standard ring or rim found on a conventional automotive steering wheel.

A vehicle, such as an automobile, includes a steering system for controlling a traveling direction. In general, an operation mechanism of such a steering system includes, for example, a steering wheel used by an occupant to control the steering angle. Current steering wheels are round and keep occupant heads from moving too far forward and potentially passing over the top of a deployed driver airbag. However, when a yoke steering wheel is employed, the occupant may be located forward because the steering wheel does not provide a natural barrier due to the open portions of the yoke. Yoke steering wheels permit for at least a portion of the occupant (e.g, the occupant's head) to be located above the steering wheel and airbag module.

This invention controls the trajectory of the cushion and shape of the airbag relative to the open area above the driver airbag due to a yoke steering wheel. By controlling the cushion trajectory, the performance of the airbag can be managed to account for the situation when an occupant is detected over the diver airbag module or over the open portion of the yoke steering wheel. The airbag module provides for a softer or restrained deployment when the occupant is located directly over the steering wheel. An airbag control module is configured to receive an indication of occupant position (e.g., using sensor input and an integrated or separate control module). Based on the occupant position, the control module will control the deployment of the airbag into one of at least two different configurations.

To control the trajectory of the cushion, a tether is anchored at one end on the cushion at the twelve (12) o'clock area at the open spoke area of a yoke steering wheel. Thus, the depression in the airbag is positioned to match the position of the gap or opening between the spokes or rim in the steering wheel when considering positions relative to the center of the steering wheel or the deployed cushion or airbag. The connection point of the tether to the cushion may vary based on the configuration of the vehicle, the shape of the steering wheel or other factors. In general, the tether is connected to the upper portion of the airbag and preferably between the 10 and 2 o'clock positions. The second end of the tether is anchored to a triggered release device that is able to free the tether when needed for a normal restraint. The tether may also remain anchored at the trigger release device when needed for out of position conditions. Although only a single tether is shown in the drawings, the module may include more than one tether configured in parallel, "V", "Y" or any other suitable configuration.

Accordingly, an object of the present disclosure is to provide a dynamic cushion shape for a yoke steering wheel driver airbag.

BRIEF DESCRIPTION OF THE DRAWINGS

The features, aspects, and advantages of the present invention will become apparent from the following description, and the accompanying exemplary embodiments shown in the drawings, which are briefly described below.

DETAILED DESCRIPTION

According to one embodiment of the disclosure, a yoke type steering wheel comprises a dynamic shape airbag module. The dynamic shape airbag module comprises a tether with a first end attached to the upper portion of a cushion of the airbag module. The second end of the tether is anchored to a triggered release device that is capable of selectively holding the tether to change the airbag shape when needed for an out of position (OOP) occupant condition. An OOP condition indicates a passenger position which is not the normal upright and forward-facing position. An example of an OOP condition is when the occupant is reaching for a vehicle instrument such as the radio or the center console, or during unpredictable scenarios such as an unbelted occupant during a high acceleration event. The triggered release device may be, for example, an outer cylinder housing a piston, and a sealing ring.

Figure 1:
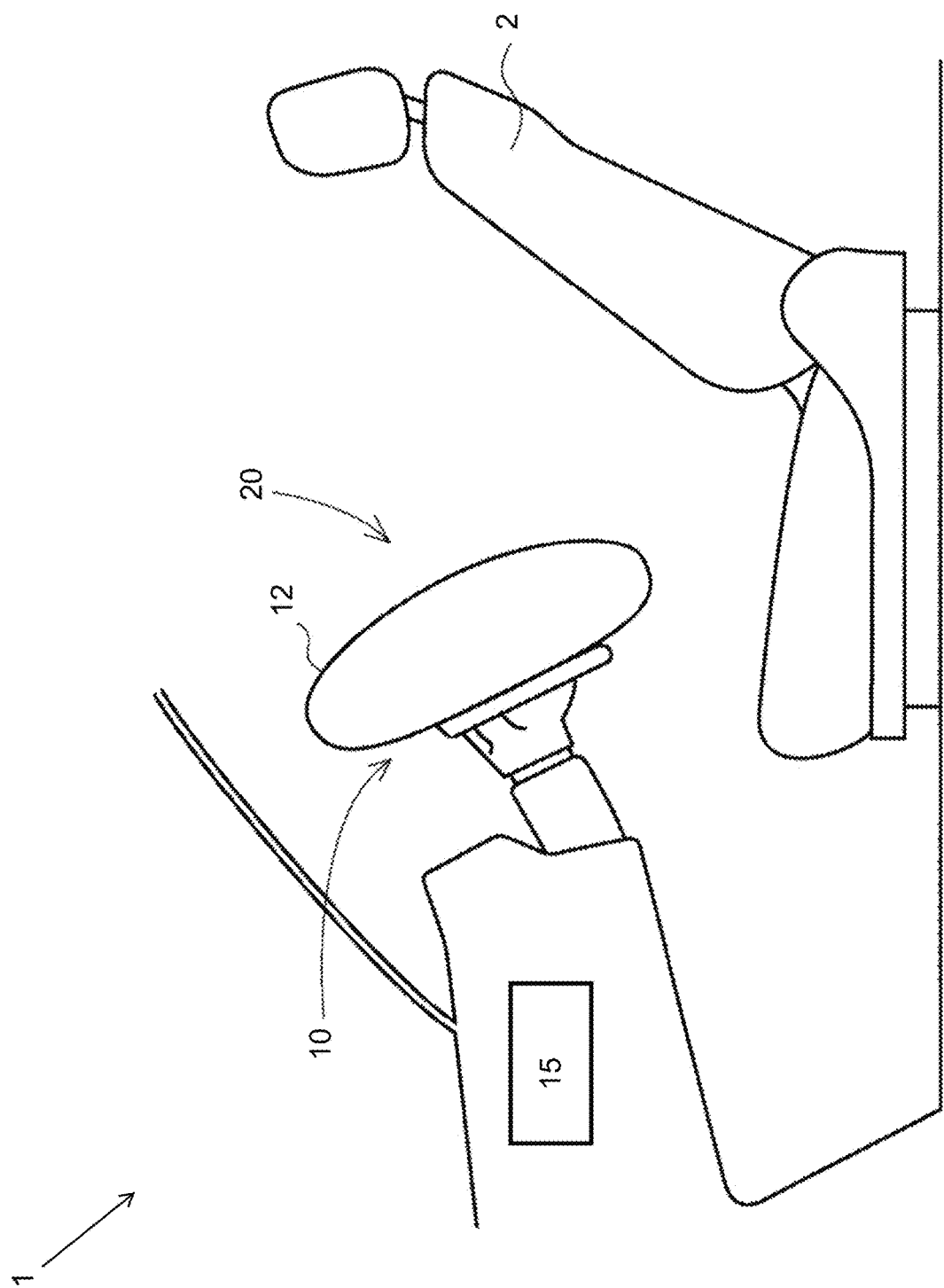
FIG. 1 is a side view of a driver side of a passenger compartment of a vehicle.

FIG. 1 illustrates a driver side of a vehicle 1 with passenger seat 2 and a yoke type steering wheel 10 comprising a deployed driver side airbag module 20. The driver side airbag module 20 comprises an inflator, a cushion or airbag 22, a tether, and a triggered tether release device. The deployment of the airbag contained in the module is configured to be directed by a controller 15.

Figure 2:
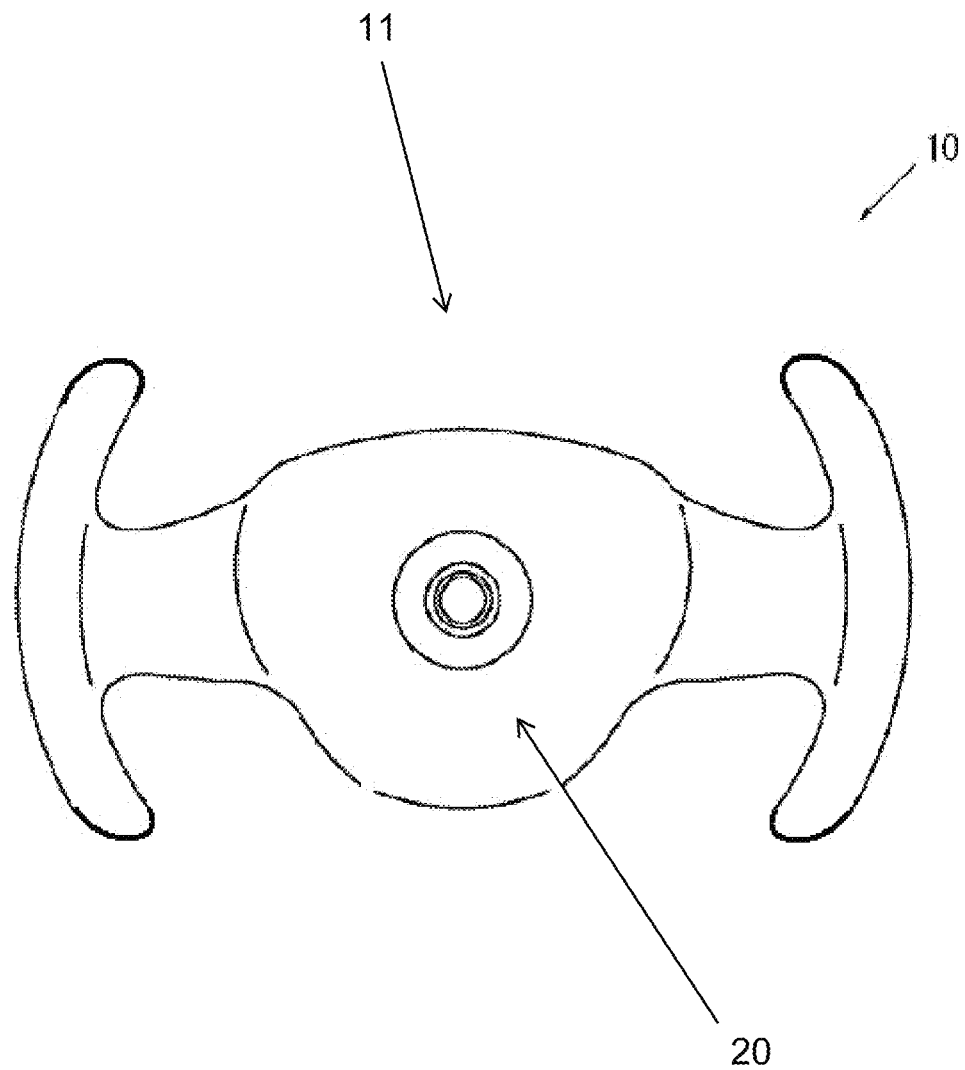
FIG. 2 is a front view of yoke type steering wheel containing an exemplary airbag module.

FIG. 2 illustrates the yoke type steering wheel 10 with a driver side airbag module 20. The yoke type steering wheel 10 comprises an open area 11 at the upper portion.

Figure 3A:
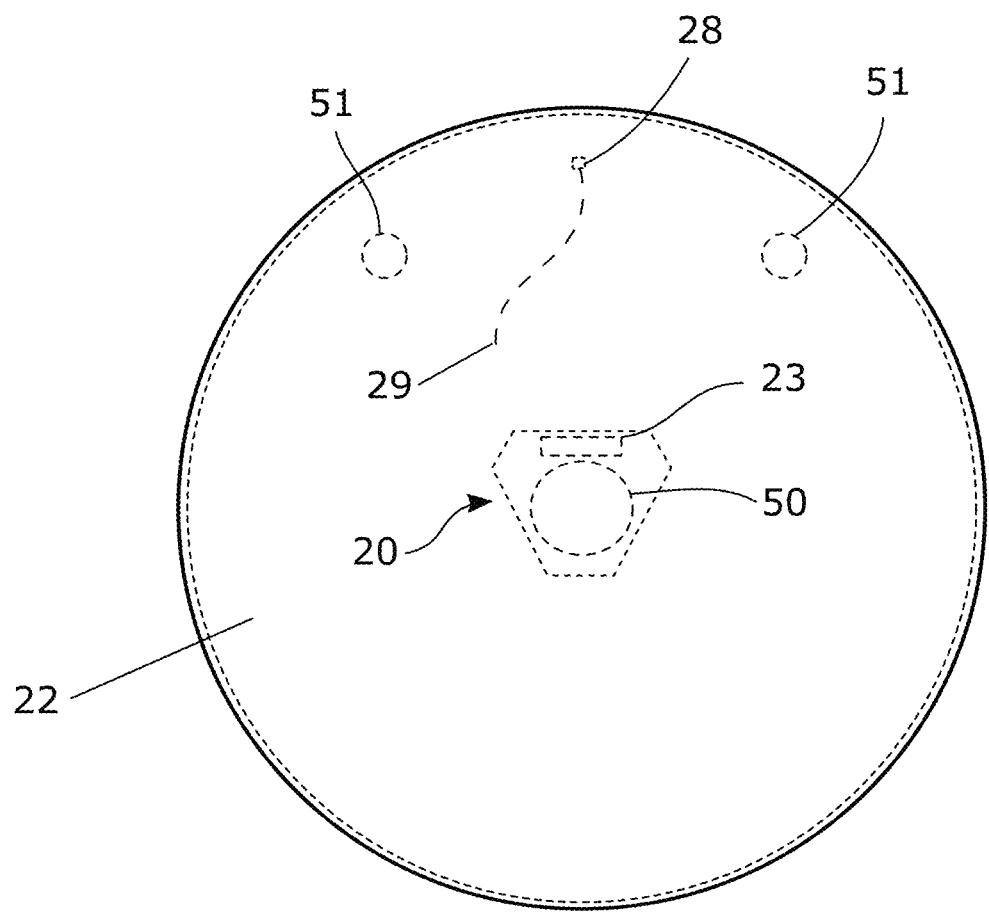
FIG. 3a is a front view of a deployed driver's side airbag.
Figure 3B:
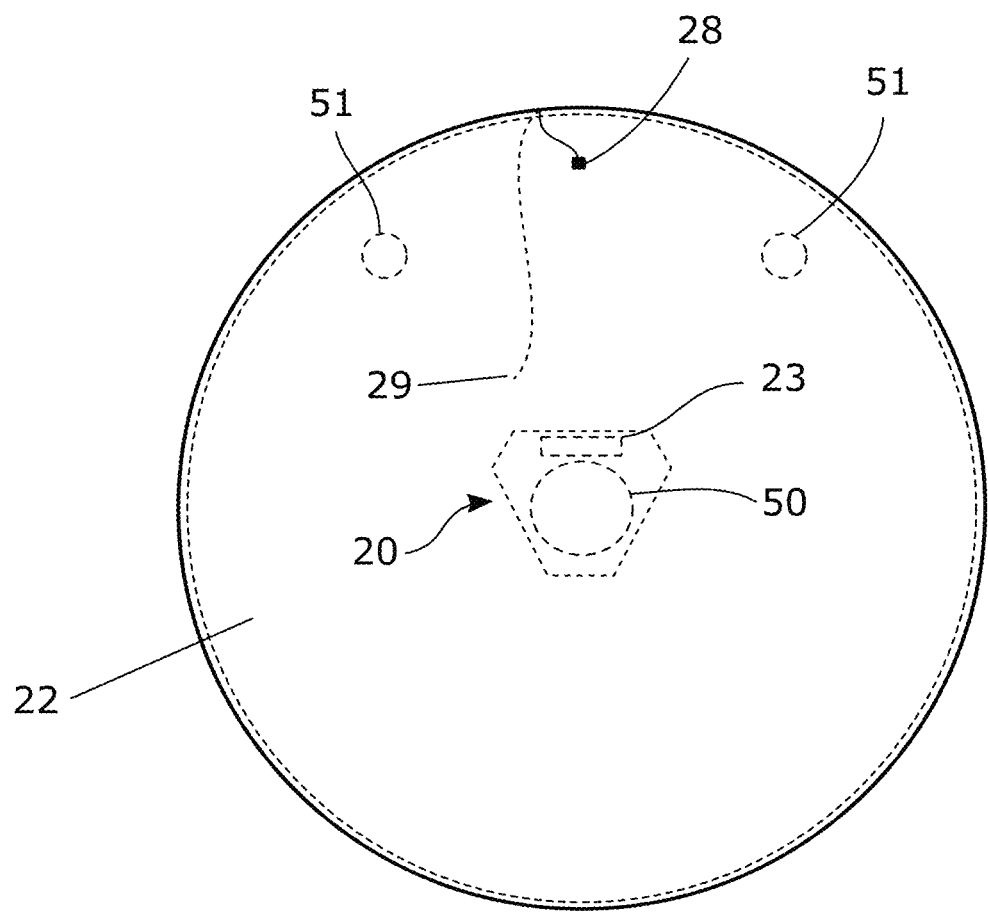
FIG. 3b is a front view of a deployed driver's side airbag.

FIGS. 3a and 3b illustrates a deployed driver side airbag module 20 in a released configuration. The airbag module 20 comprises an inflator, a cushion 22, a tether, and a triggered tether release device. In the released configuration, the tether is detached from the tether release device to allow the cushion 22 to fully inflate as shown in FIGS. 3A and 3B. The released configuration provides for occupant safety during normal restraint conditions (non-OOP conditions). FIG. 3a shows the tether connected to the windshield facing panel and FIG. 3b shows the tether connected to the occupant facing panel.

Figure 4A:
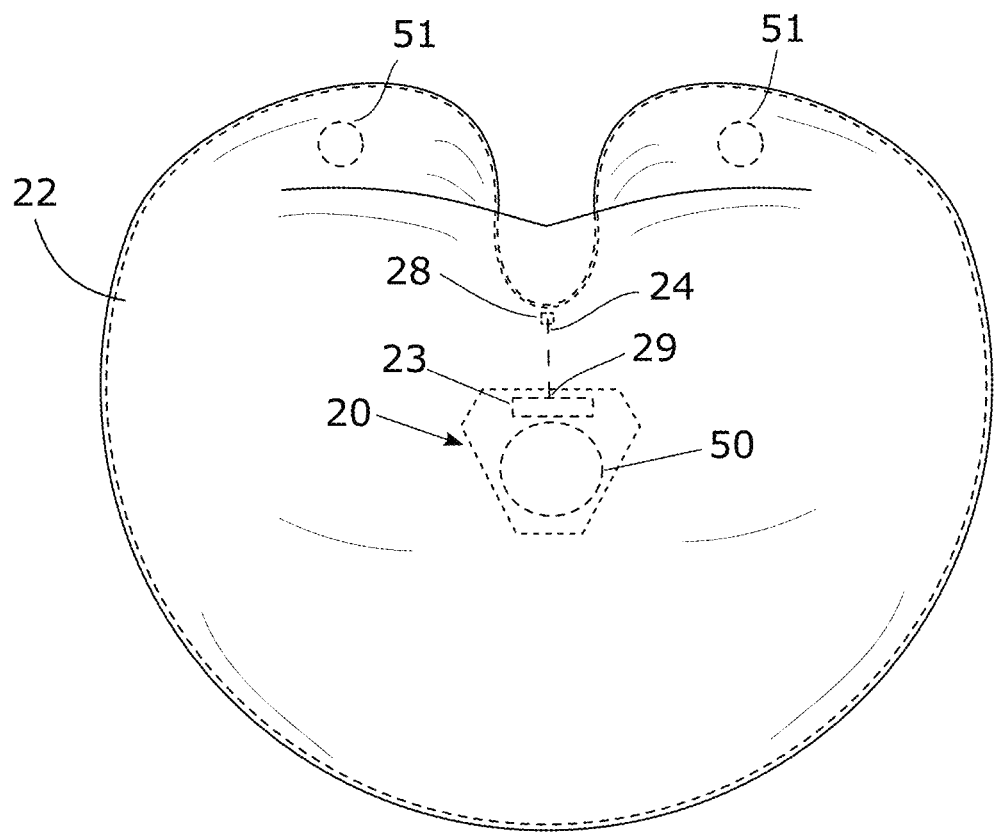
FIG. 4a is a front view of the airbag of FIG. 3a while deployed during an out of position condition.
Figure 4B:
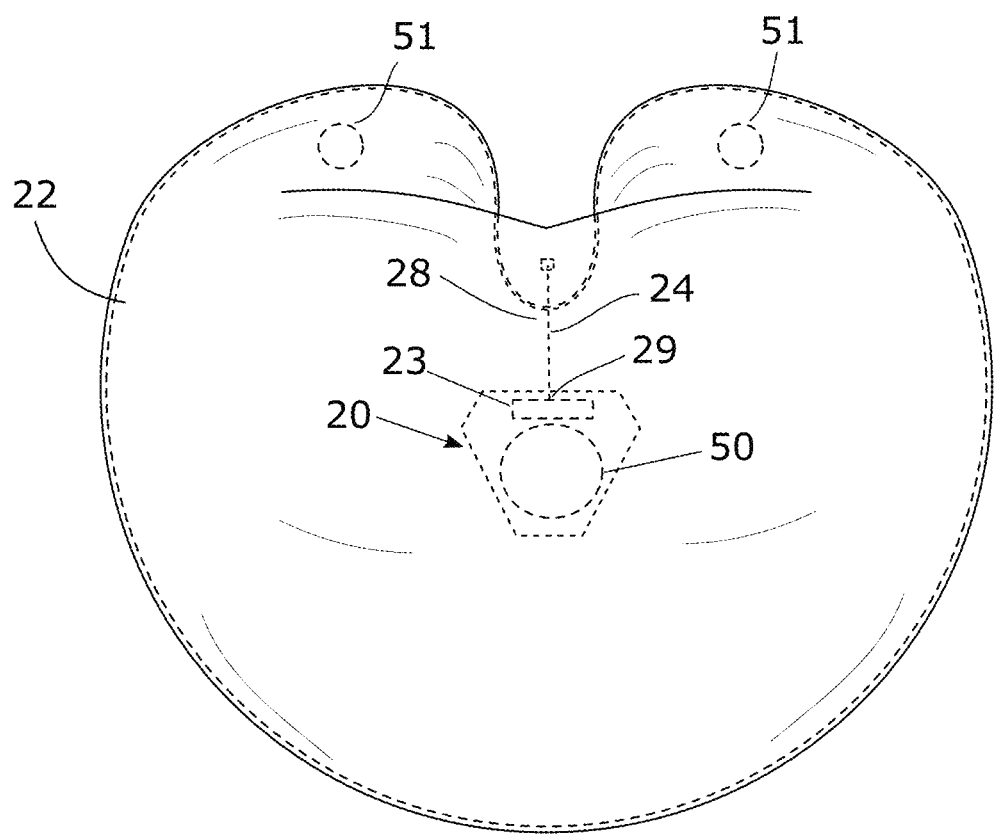
FIG. 4b is a front view of the airbag of FIG. 3b while deployed during an out of position condition.

FIGS. 4a and 4b illustrates a deployed driver side airbag module 20. In the configuration shown in FIGS. 4a and 4b, the tether is held at one end by the tether release device to allow the cushion 22 to inflate into a U-shape by creating a depression 25. The depression 25 corresponds to an upward facing gap in the inflated cushion 22. At the other end, the tether is attached to the cushion 22 at the 12 o'clock position adjacent to an open area 11 in the yoke steering wheel to accommodate the occupant during OOP conditions. The cushion 22 includes an opening 50 for the inflator, and may optionally include vent openings 51. FIG. 4a shows the tether connected to the windshield facing panel and FIG. 4b shows the tether connected to the occupant facing panel.

Figure 5:
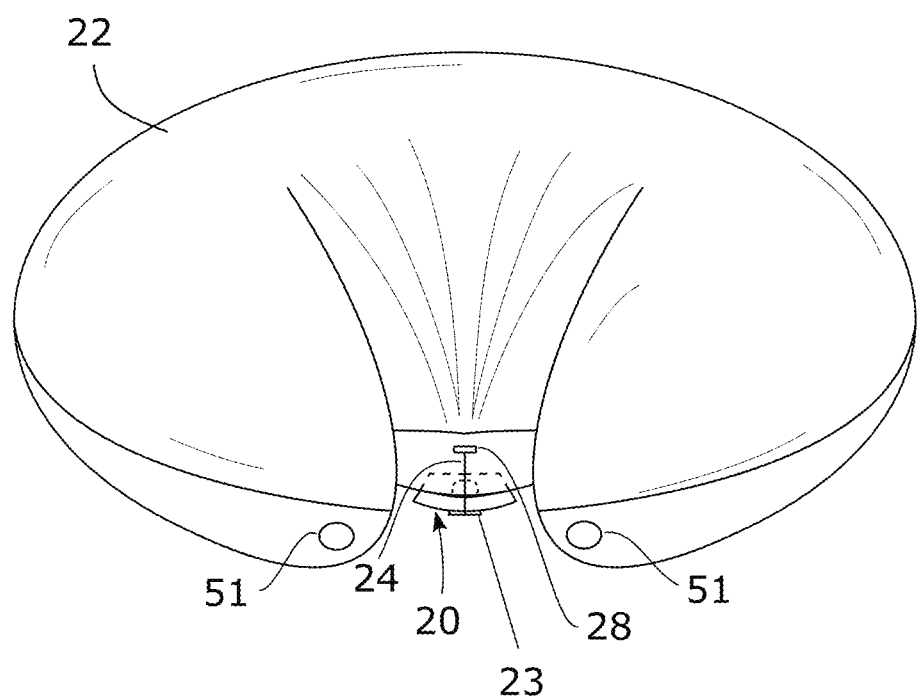
FIG. 5 is a top view of the airbag of FIG. 4.

FIG. 5 shows a deployed driver side airbag module 20 from the top of the airbag or cushion 22 (12 o'clock position). The depression 25 is created by the tether on the upper side of the airbag for occupant protection during OOP conditions.

Figure 6:
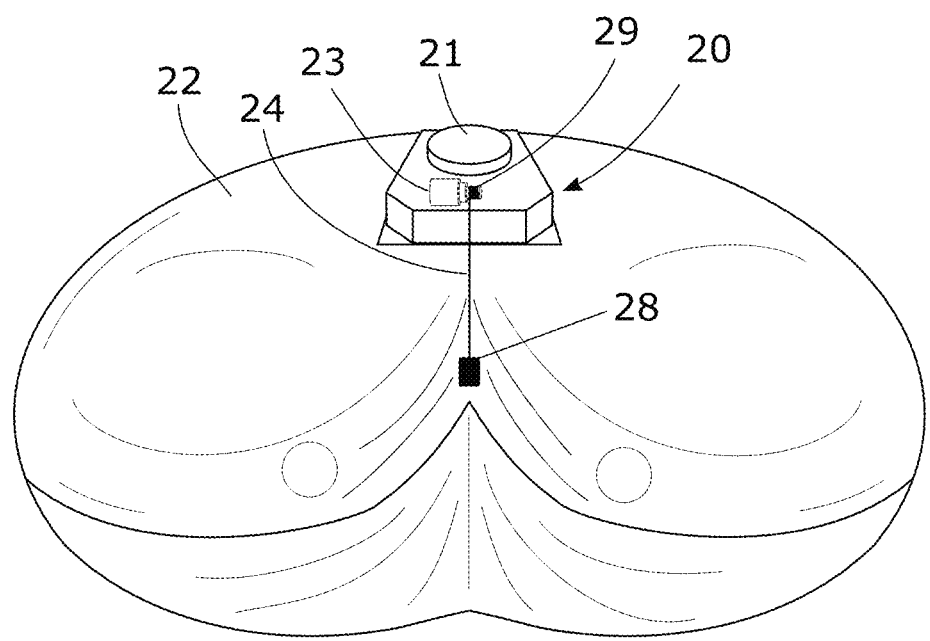
FIG. 6 is a perspective view showing the top and rear of the airbag and module of FIG. 4.
Figure 7:
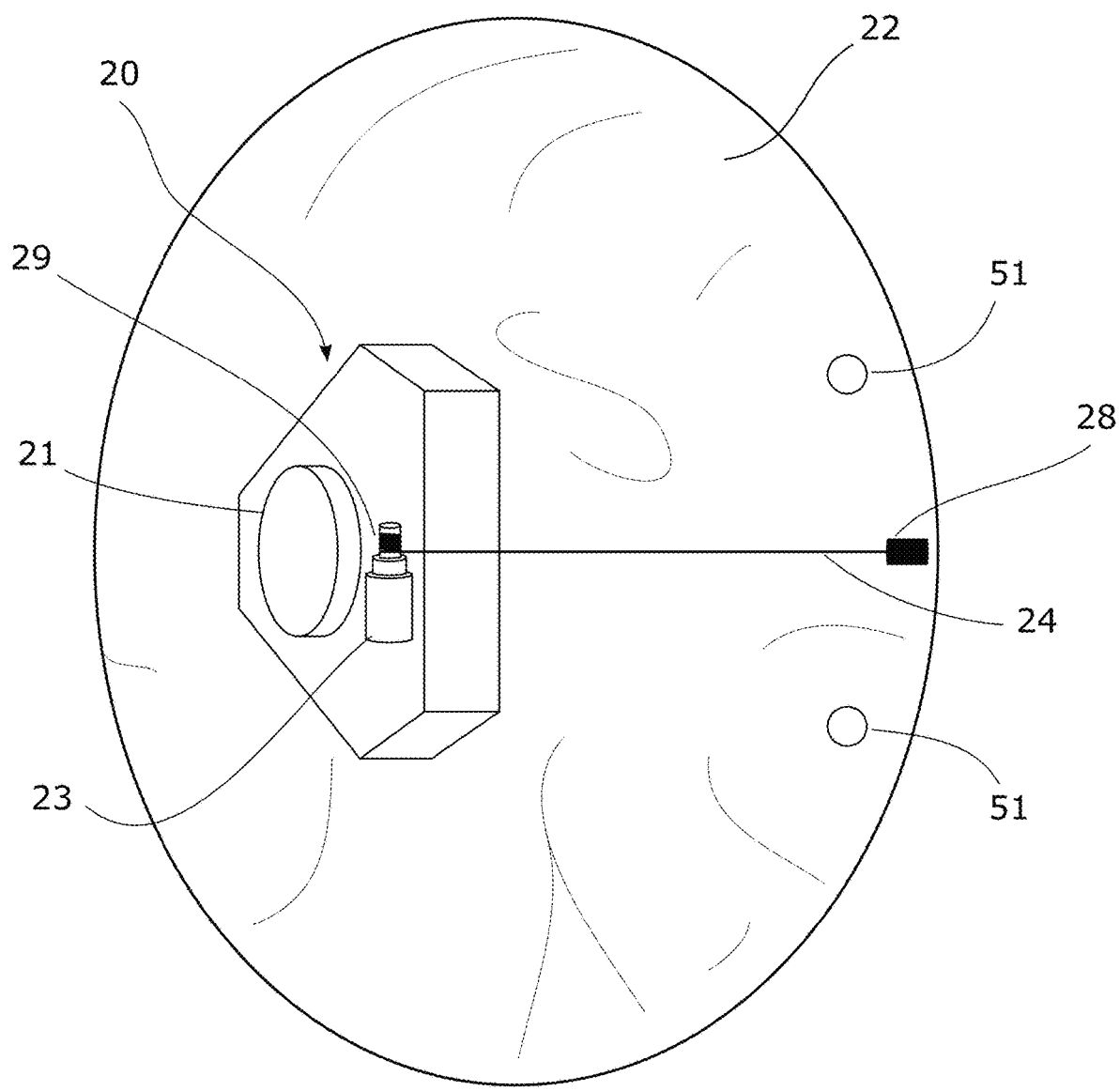
FIG. 7 is a rear close up view of the airbag and module of FIG. 4.

FIG. 6 illustrates a deployed driver side airbag module 20 from the upper side of the cushion (12 o'clock position) with the cushion 22 facing down. The inflator 21 is shown and the triggered tether release device 23 having an attached tether 24 is disposed adjacent to the inflator 21. A depression 25 in the cushion created by the tether 24 is shown on the upper or top side of the cushion during OOP conditions. The tether is connected to the top of the cushion so that the cushion is restrained from fully expanding at the location where the tether is connected to the cushion. The tether is preferably connected to the edge of the cushion at a top central location between approximately the 10 and 2 o'clock positions. The cushion may be formed by a front and rear panel (occupant facing and windshield facing panels, respectfully). FIG. 7 shows the tether attached to the rear panel, but the tether may extend to the front panel of the cushion and attach to the front panel after crossing over the boundary where the front and rear panels are connected to thereby restrain the deploying depth of the cushion and reduce the loft of the cushion.

The inflator 21 is a gas generator that generates gas to be supplied to the airbag. The inflator 21 is connected to an ECU (electronic control unit or controller) and is controlled on the basis of measured values of an acceleration sensor (not shown). When the ECU senses or predicts a collision based on, for example, an abrupt deceleration of a vehicle, the inflator 21 is ignited in response to an ignition signal from the ECU. The inflator generates inflation gas by burning a propellant or other material stored in the inflator 21 and supplies the gas to the airbag. A stored gas inflator may be used in another embodiment.

FIG. 7 shows a close up of the airbag module 20. The tether 24 is selectively attached to the tether release device 23. During a non-OOP condition, the tether release device 23 is triggered and releases the tether 24 to allow the bag to fill normally as shown in FIG. 1. The tether 24 is attached to the cushion 22 at a first end 28 and the tether release device 23 at a second tether end 29. During an OOP condition, the tether release device 23 holds the tether 24 in place so that the cushion 22 takes a U-shaped form. The occupant position may be monitored using various sensors (e.g., capacitive, ultrasonic, optical, force, etc.) and determined by a controller or processor. The same or different controller may be used to control the airbag deployment and for the determination of occupant location and position.

Figure 8:
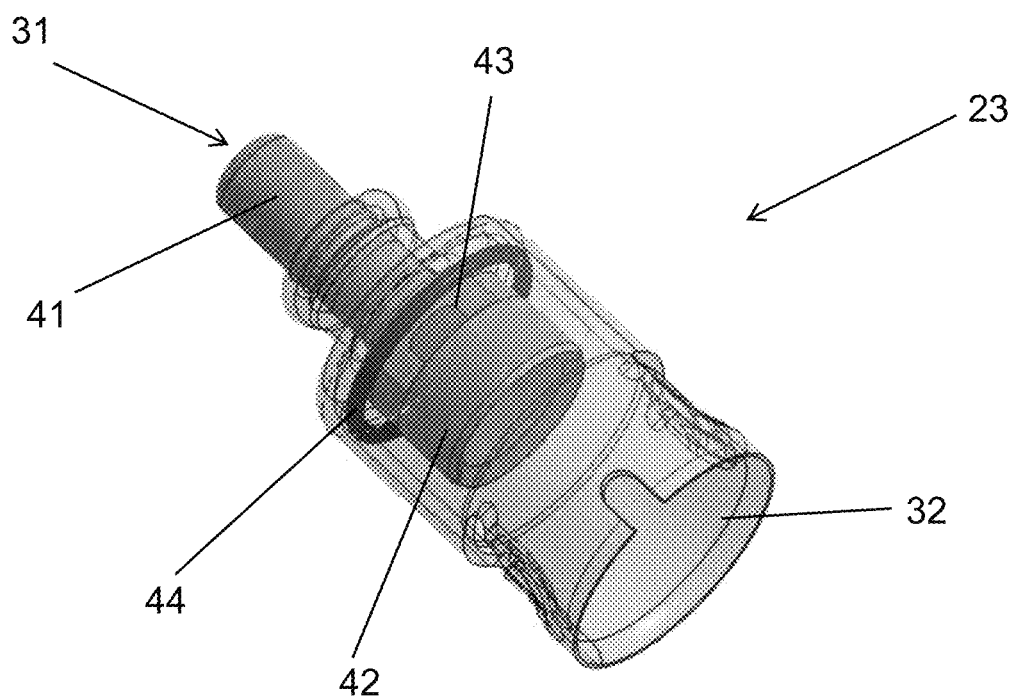
FIG. 8 is a tether release device for an airbag module.
Figure 9:
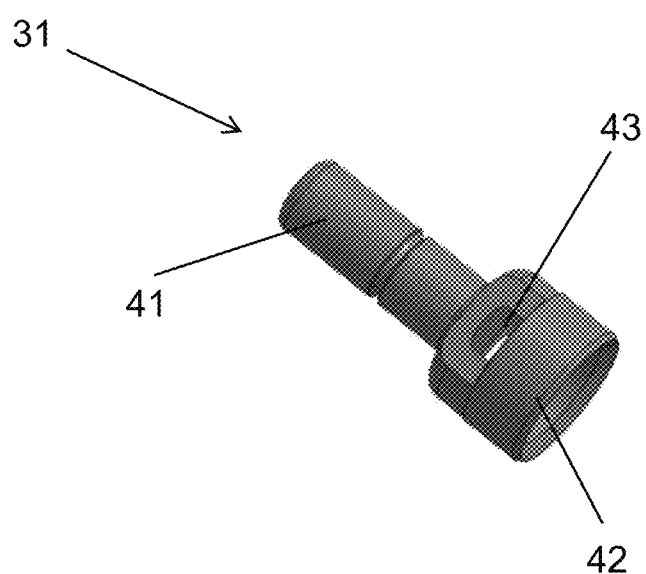
FIG. 9 is a piston portion of the tether release device of FIG. 8.

FIGS. 8 and 9 show components of the tether release device 23. In the device 23, a cylindrical piston 31 is located within a cylindrical housing 32. As described above, the first end of the tether 24 is attached to the cushion and a second end of the tether is attached to a first end 41 of the piston. The first end 41 of the piston may be disposed outside of the cylindrical housing 32 and a second end 42 of the piston may be disposed within the cylindrical housing 32 when the airbag is not deployed or deployed in an OOP condition. The tether may be looped at the first end 41 of the piston. For example, the tether may be looped through or pass through the end of the piston so that when the piston is drawn further into the cylinder the tether is severed due to contact with the cylinder. In an alternative embodiment, the tether may be indirectly attached to the piston (e.g. via a pin or ring that is attached to the tether). In the alternative embodiment, the pin or other element is severed or released when the piston is forced further into the cylinder thereby releasing the tether. In an alternative embodiment, the tether may be looped around the piston. In the alternative embodiment, the tether is released from around the piston when the piston is forced further into the cylinder.

A gas generator is provided to drive the piston when the tether is to be released. The gas generator may be triggered during a non-OOP condition (at the same time when the airbag is triggered to deploy) to push piston 31 further inwards within the cylindrical housing 32 to release the tether. The triggering of the gas generator may be controlled by the same or different controller that determines the existence of an OOP condition. The gas generated from the gas generator flows through piston apertures 43 located at the second piston end 42 to push piston 31. This allows the cushion to fully inflate into the non-OOP condition. During an OOP condition, the piston 31 will hold the tether at the second end while the inflator inflates the cushion, causing the cushion to be held by the first end of tether. A sealing ring 44 may be disposed between the piston 31 and the cylindrical housing 32 to prevent the gas generated from the gas generator from leaking thus allowing proper actuation of the piston 31.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the airbag module as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

In sum, this application is directed to a yoke steering wheel driver airbag module to deploy an airbag having two different configurations or shapes. One shape is used for standard seated occupants. The second shape is used for OOP occupants and is formed by a tether that restrains the deployment of the airbag. The shape is controlled by a tether that is connected to the cushion at one end and releasably anchored at the other end by a triggered release device.

What is claimed is:

1. A driver side airbag module for protecting the driver of a vehicle comprising:
   an inflatable airbag cushion;
   an inflator configured to inject gases to the cushion;
   a tether including a first end attached to the cushion;
   a triggered release device attached to a second end of the tether, wherein the triggered release device is configured to control and maintain the shape of the cushion by selectively holding the second end of the tether to thereby restrain at least a portion of the cushion when the inflator inflates the cushion;
   wherein the triggered release device is configured to release the second end of the tether when the driver is determined not to be in an out of position (OOP) condition;
   wherein the first end of the tether is connected to the top of the cushion so that the cushion is restrained from fully expanding at the location where the first end of the tether is connected to the cushion;
   wherein the first end of the tether is connected to the cushion at a top central location between approximately the 10 and 2 o'clock positions; and
   wherein the cushion is configured to inflate into a u-shaped configuration when the second end of the tether is not released.

2. The airbag module of claim 1, wherein the cushion includes a front and rear panel, and wherein the tether attaches to the front panel after crossing over the boundary where the front and rear panels are connected to thereby restrain the deploying depth of the cushion and reduce loft.

3. The airbag module of claim 1, wherein the cushion includes a front and rear panel, and wherein the tether is connected to the rear panel to thereby restrain the deploying depth of the cushion and reduce loft.

4. The airbag module of claim 1, wherein the u-shaped configuration includes a depression in the cushion located at a top central location of the cushion between approximately the 10 and 2 o'clock positions.

5. A vehicle steering system comprising:
   a yoke type steering wheel configured to be controlled by an occupant of the vehicle;
   an airbag module located in the steering wheel including an inflator and an airbag, wherein the airbag is configured to inflate into two configurations, wherein in the first configuration the airbag is fully inflated into a circular configuration and wherein in the second configuration the airbag inflates into a u-shaped configuration, wherein the u-shaped configuration is formed by a tether connected at a first end to the airbag and at a second end to a tether release device;
   wherein the tether release device is configured to stay connected to the tether when the occupant is determined to be in an out of position (OOP) condition;
   wherein the tether release device is configured to release the second end of the tether when the occupant is not in an OOP condition; and
   wherein the tether is connected to the airbag at a position that results in an upward facing gap in the u-shaped inflated airbag.

6. The vehicle steering system of claim 5, wherein the tether release device includes a piston and a cylinder and wherein a gas generator is provided for driving the piston within the cylinder.

7. The vehicle steering system of claim 6, wherein the tether is connected to the piston and is configured to be separated from the tether release device when the piston is driven into the cylinder.

8. The vehicle steering system of claim 5, wherein the airbag is formed by two connected substantially circular panels, and wherein one of the panels is occupant facing and the other panel is windshield facing, and wherein the tether is connected to the windshield facing panel.

9. The vehicle steering system of claim 8, wherein the tether is connected to the windshield facing panel at a location approximately between 10 o'clock and 2 o'clock with the 12 o'clock position being located at the upward most point of the airbag.

10. The vehicle steering system of claim 5, wherein the depression in the u-shaped airbag is located in substantially the same position as a gap between spokes in the yoke steering wheel when considering the position relative to the center of the steering wheel or the center of the airbag.

11. An airbag module located in a yoke type steering wheel in a vehicle, the module comprising:
   an inflator and an airbag, wherein the airbag is configured to inflate into a u-shaped configuration, wherein the u-shaped configuration is formed by a tether connected at a first end to the airbag and at a second end to a tether release device;

wherein the tether release device is configured to stay connected to the second end of the tether when a driver of the vehicle is determined to be in an out of position (OOP) condition;

wherein the tether release device is configured to release the second end of the tether when the driver is not in an OOP condition;

wherein the tether is connected to the airbag at a position that results in a depression in the u-shaped inflated airbag; and wherein the depression in the u-shaped airbag is positioned in substantially the same position as a gap between spokes of the yoke type steering wheel.

12. The airbag module of claim 11, wherein the tether release device includes a piston and a cylinder and wherein a gas generator is provided for driving the piston within the cylinder.

13. The airbag module of claim 12, wherein the tether is connected to the piston and is configured to be separated from the tether release device when the piston is driven into the cylinder.

14. The airbag module of claim 13, wherein the tether release device is configured so that the tether separates due to contact between the tether and the cylinder.

15. The airbag module of claim 11, wherein the airbag is formed by two connected substantially circular panels, and wherein one of the panels is occupant facing and the other panel is windshield facing, and wherein the tether is connected to the windshield facing panel.

* * * * *